US011741719B2

(12) United States Patent
Bacchus et al.

(10) Patent No.: US 11,741,719 B2
(45) Date of Patent: Aug. 29, 2023

(54) APPROACH TO MANEUVER PLANNING FOR NAVIGATING AROUND PARKED VEHICLES FOR AUTONOMOUS DRIVING

(71) Applicant: GM GLOBAL TECHNOLOGY OPERATIONS LLC, Detroit, MI (US)

(72) Inventors: Brent N. Bacchus, Sterling Heights, MI (US); Pinaki Gupta, Novi, MI (US); Sayyed Rouhollah Jafari Tafti, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 466 days.

(21) Appl. No.: 16/552,686

(22) Filed: Aug. 27, 2019

(65) Prior Publication Data
US 2021/0061293 A1 Mar. 4, 2021

(51) Int. Cl.
*G06V 20/58* (2022.01)
*G05D 1/00* (2006.01)
*B60W 50/00* (2006.01)
*G06V 10/764* (2022.01)

(52) U.S. Cl.
CPC .......... *G06V 20/58* (2022.01); *B60W 50/0097* (2013.01); *G05D 1/0088* (2013.01); *G06V 10/764* (2022.01)

(58) Field of Classification Search
CPC .. B60W 50/0097; G05D 1/0088; G06V 20/58
See application file for complete search history.

(56) References Cited

U.S. PATENT DOCUMENTS

| 9,607,454 | B1* | 3/2017 | Raghu | G08G 1/0133 |
| 10,074,279 | B1* | 9/2018 | Xu | B60W 10/04 |
| 10,140,854 | B2* | 11/2018 | Fowe | G08G 1/096816 |
| 10,546,489 | B2* | 1/2020 | Suzuki | G08G 1/0112 |
| 10,562,538 | B2* | 2/2020 | Lan | B60W 60/00274 |
| 10,569,773 | B2* | 2/2020 | Zhao | G05D 1/0088 |
| 11,537,127 | B2* | 12/2022 | Wilkinson | G05D 1/0088 |
| 2016/0229402 | A1* | 8/2016 | Morita | G08G 1/096758 |
| 2018/0136662 | A1* | 5/2018 | Kim | G01C 21/3415 |
| 2018/0224860 | A1* | 8/2018 | Warshauer-Baker | G08G 1/166 |
| 2019/0049968 | A1* | 2/2019 | Dean | G05D 1/0088 |
| 2019/0367021 | A1* | 12/2019 | Zhao | B60W 60/00274 |
| 2020/0231146 | A1* | 7/2020 | Miyano | B60W 30/09 |
| 2021/0061293 | A1* | 3/2021 | Bacchus | B60W 50/0097 |

OTHER PUBLICATIONS

Wikipedia, Von Neumann-Morgenstern utility theorem, Sep. 25, 2018, https://en.wikipedia.org/w/index.php?title=Von_Neumann%E2%80%93Morgenstern_utility_theorem&oldid=861188636 (Year: 2018).*

* cited by examiner

*Primary Examiner* — Michael A Berns
(74) *Attorney, Agent, or Firm* — Cantor Colburn LLP

(57) ABSTRACT

An autonomous vehicle, system and method of navigating the autonomous vehicle. The system includes one or more sensors for obtaining data with respect to a remote stationary vehicle, and a processor. The processor is configured to classify the remote stationary vehicle into an object hypothesis based on the data, determine an actionable behavior of the autonomous vehicle based on a probability for the object hypothesis, and navigate the autonomous vehicle with respect to the remote vehicle via the actionable behavior.

17 Claims, 7 Drawing Sheets

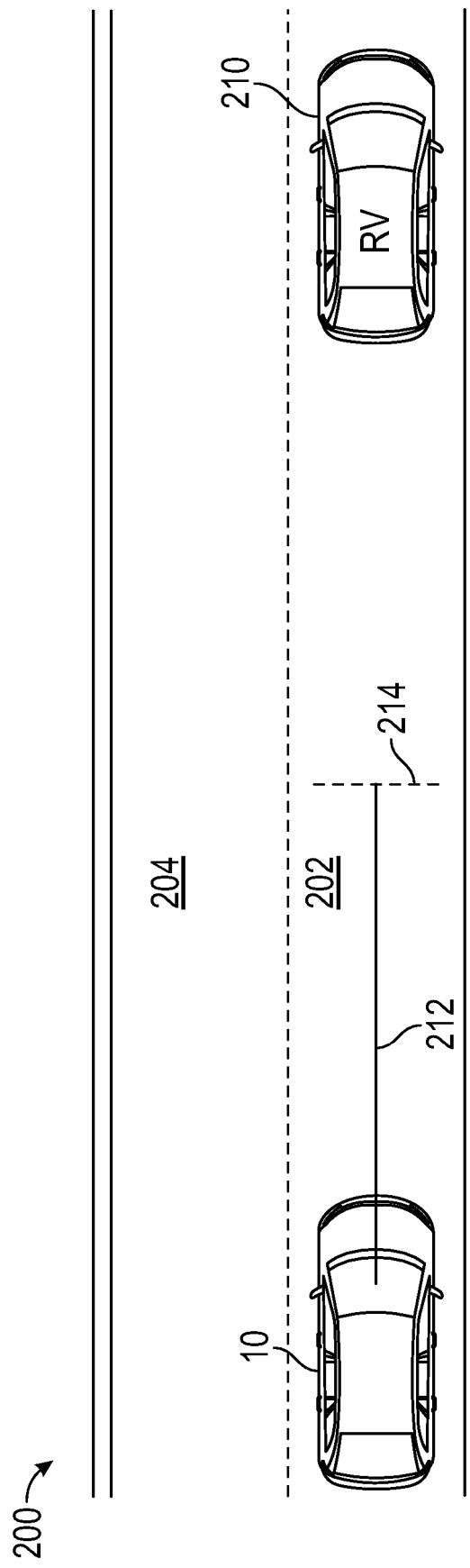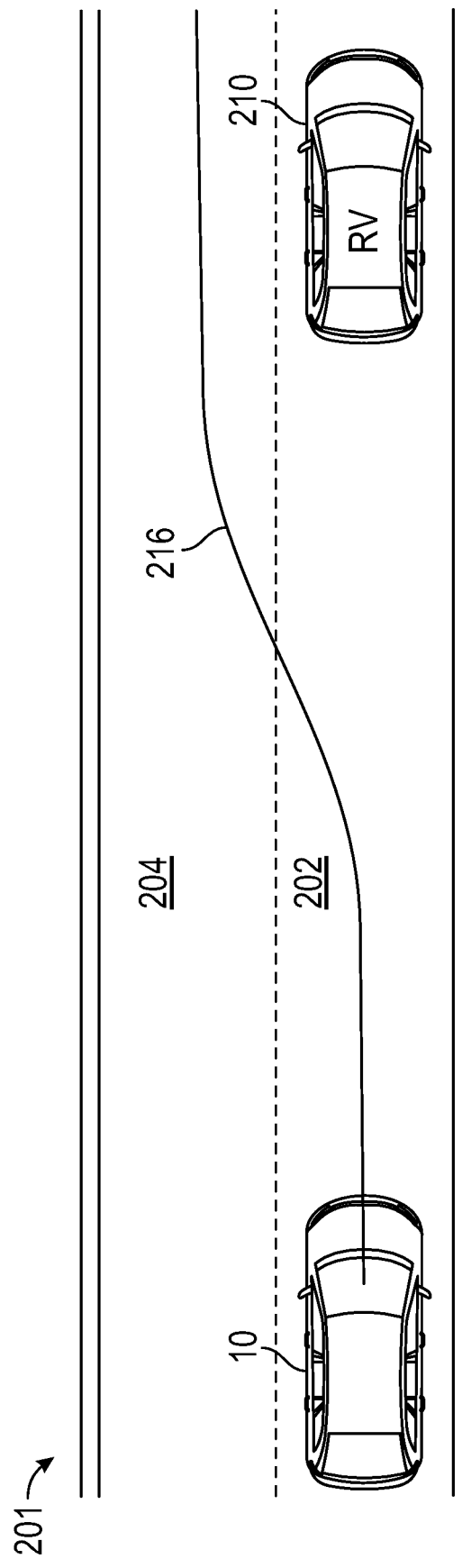

APPROACH TO MANEUVER PLANNING FOR NAVIGATING AROUND PARKED VEHICLES FOR AUTONOMOUS DRIVING

INTRODUCTION

The subject disclosure relates to autonomous vehicles and, in particular, to a system and method for navigating the autonomous vehicle with respect to a stopped or stationary vehicle.

An autonomous vehicle is able to move with respect to vehicles and plan its driving behavior based on the actions of remote vehicles in its surroundings. However, when stopping behind a remote vehicle, the autonomous vehicle does not have enough information to determine whether the remote vehicle is temporarily parked, such as at a red light, or permanently parked. Without such information, the autonomous vehicle can inadvertently find itself stopped behind a parked vehicle for an extended period. Accordingly, it is desirable to provide a system and method for classifying stationary vehicles and thereby plan a suitable behavior with respect to the stationary vehicle.

SUMMARY

In one exemplary embodiment, a method of navigating an autonomous vehicle is disclosed. A remote stationary vehicle is classified into an object hypothesis. An actionable behavior of the autonomous vehicle is determined based on a probability for the object hypothesis. The autonomous vehicle is navigated with respect to the remote vehicle via the actionable behavior.

In addition to one or more of the features described herein, the method includes calculating the probability for the object hypothesis of the remote stationary vehicle, assigning a proposed behavior to the autonomous vehicle for the object hypothesis, calculating a Von Neumann-Morgenstern (VNM) cost value for the autonomous vehicle for the proposed behavior, determining a set cost to the autonomous vehicle for the proposed behavior based on the cost value and the probability of the object hypothesis, and determining the actionable behavior based on the set cost. In an embodiment in which the remote stationary vehicle is classified into a plurality of object hypotheses, the method further includes determining a set cost for each of the plurality of object hypotheses, determining a total set cost based on the set costs for the plurality of object hypotheses, and determining the actionable behavior based on the total set cost. In an embodiment in which the remote stationary vehicle includes a plurality of remote vehicles with each remote vehicle having a plurality of object hypotheses, the method further includes determining a total set cost for each remote vehicle and determining the actionable behavior for the autonomous vehicle using the total set costs. The method further includes classifying the remote stationary vehicle using kinematic data and perception data related to the remote stationary vehicle. The method further includes applying a first Kalman filter to the kinematic data for determining a likelihood of the remote stationary vehicle being a non-parked vehicle and a second Kalman filter to the kinematic data for determining a likelihood of the remote stationary vehicle being a parked vehicle. The object hypothesis includes a spatial hypothesis based on a current state of the remote stationary vehicle and a predicted hypothesis based on a predicted future motion for the remote stationary vehicle.

In another exemplary embodiment, a system for navigating an autonomous vehicle is disclosed. The system includes one or more sensors for obtaining data with respect to a remote stationary vehicle, and a processor. The processor is configured to classify the remote stationary vehicle into an object hypothesis based on the data, determine an actionable behavior of the autonomous vehicle based on a probability for the object hypothesis, and navigate the autonomous vehicle with respect to the remote vehicle via the actionable behavior.

In addition to one or more of the features described herein, the processor is further configured to calculate the probability for the object hypothesis of the remote stationary vehicle, assign a proposed behavior to the autonomous vehicle for the object hypothesis, calculate a Von Neumann-Morgenstern (VNM) cost value for the autonomous vehicle for the proposed behavior, determine a set cost for the autonomous vehicle for the proposed behavior based on the cost value and the probability for the object hypothesis, and determine the actionable behavior based on the set cost. In an embodiment in which the remote stationary vehicle is classified into a plurality of object hypotheses, the processor is further configured to determine a set cost for each of the plurality of object hypotheses, determine a total set cost based on the set costs for the plurality of object hypotheses, and determine the actionable behavior based on the total set cost. In an embodiment in which the remote stationary vehicle further includes a plurality of remote vehicles with each remote vehicle having a plurality of object hypotheses, the processor is further configured to determine a total set cost for each remote vehicle and determine the actionable behavior for the autonomous vehicle using the total set costs. The processor is further configured to classify the remote stationary object using kinematic data and perception data related to the remote stationary vehicle. The processor is further configured to apply a first Kalman filter to the kinematic data for determining a likelihood of the remote stationary vehicle being a non-parked vehicle and a second Kalman filter to the kinematic data for determining a likelihood of the remote stationary vehicle being a parked vehicle. The processor is further configured to form the object hypothesis from at least one spatial hypothesis based on a current state of the remote stationary vehicle and a predicted hypothesis based on a predicted future motion for the remote stationary vehicle.

In yet another exemplary embodiment, an autonomous vehicle is disclosed. The autonomous vehicle includes one or more sensors for obtaining data with respect to a remote stationary vehicle, and a processor. The processor is configured to classify the remote stationary vehicle into an object hypothesis based on the data, determine an actionable behavior of the autonomous vehicle based on a probability for the object hypothesis, and navigate the autonomous vehicle with respect to the remote vehicle via the actionable behavior.

In addition to one or more of the features described herein, the processor is further configured to calculate the probability for the object hypothesis of the remote stationary vehicle, assign a proposed behavior to the autonomous vehicle for the object hypothesis, calculate a Von Neumann-Morgenstern (VNM) cost value for the autonomous vehicle for the proposed behavior, determine a set cost to the autonomous vehicle for the proposed behavior based on the cost value and the probability of the object hypothesis, and determine the actionable behavior based on the set cost. In an embodiment in which the remote stationary vehicle is classified into a plurality of object hypotheses, the processor is further configured to determine a set cost for each object hypothesis, determine a total set cost based on the set costs for the plurality of object hypotheses, and determine the actionable behavior based on the total set cost. In an embodiment in which the remote stationary vehicle further includes a plurality of remote stationary vehicles with each remote stationary vehicle having a plurality of object hypothesis, the processor is further configured to determine a total set cost for each remote vehicle and determine the actionable behavior for the autonomous vehicle using the total set costs. The processor is further configured to classify the remote stationary object using kinematic data and perception data related to the remote stationary vehicle. The processor is further configured to apply a first Kalman filter to the kinematic data for determining a likelihood of the remote stationary vehicle being a non-parked vehicle and a second Kalman filter to the kinematic data for determining a likelihood of the remote stationary vehicle being a parked vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 2A shows a plan view of a first traffic scenario in which the autonomous vehicle of FIG. 1 is approaching a remote vehicle from behind that is non-parked or temporarily stopped;

FIG. 2B shows a plan view of a second traffic scenario in which the autonomous vehicle is approaching a remote vehicle from behind that is parked or permanently stopped;

DETAILED DESCRIPTION

Figure 1:
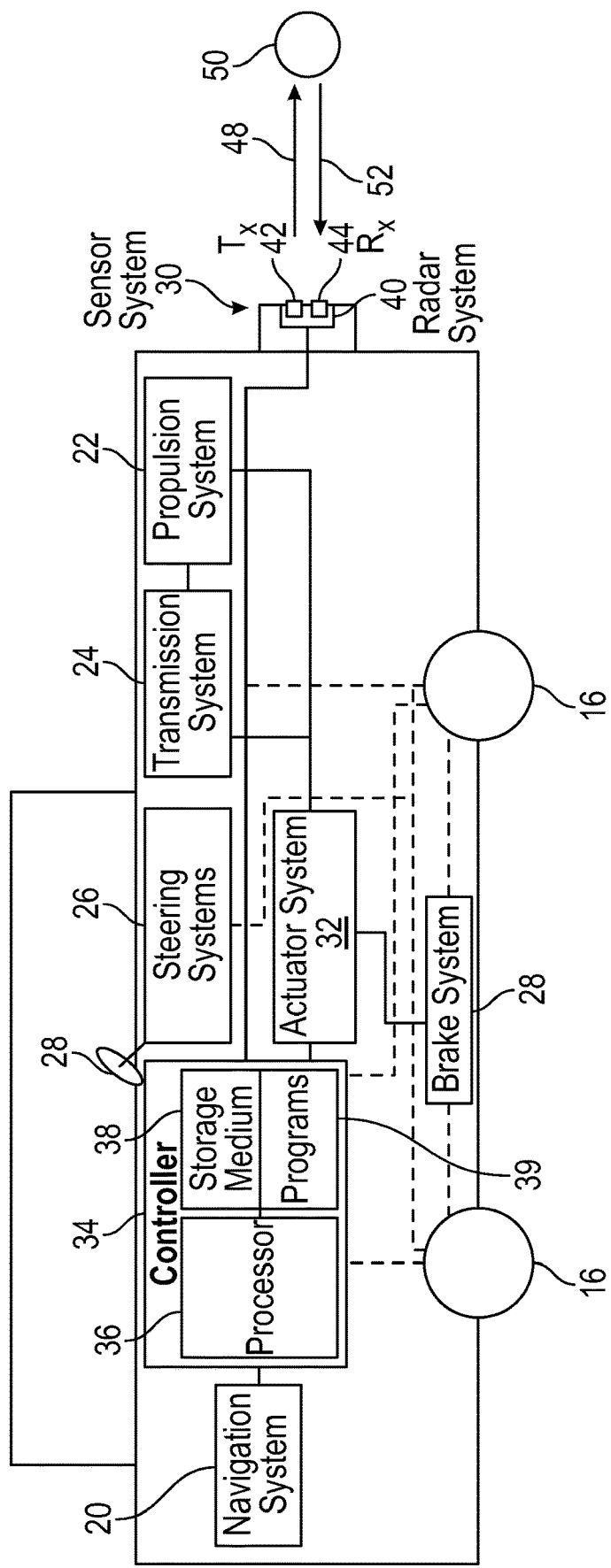
FIG. 1 shows an autonomous vehicle in an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows an autonomous vehicle 10. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. It is to be understood that the system and methods disclosed herein can also be used with an autonomous vehicle operating at any of the levels 1 through 5.

The autonomous vehicle 10 generally includes at least a navigation system 20, a propulsion system 22, a transmission system 24, a steering system 26, a brake system 28, a sensor system 30, an actuator system 32, and a controller 34. The navigation system 20 determines a road-level route plan for automated driving of the autonomous vehicle 10. The propulsion system 22 provides power for creating a motive force for the autonomous vehicle 10 and can, in various embodiments, include an internal combustion engine, an electric machine such as a traction motor, and/or a fuel cell propulsion system. The transmission system 24 is configured to transmit power from the propulsion system 22 to two or more wheels 16 of the autonomous vehicle 10 according to selectable speed ratios. The steering system 26 influences a position of the two or more wheels 16. While depicted as including a steering wheel 27 for illustrative purposes, in some embodiments contemplated within the scope of the present disclosure, the steering system 26 may not include a steering wheel 27. The brake system 28 is configured to provide braking torque to the two or more wheels 16.

The sensor system 30 includes a radar system 40 that senses objects in an exterior environment of the autonomous vehicle 10 and provides various parameters of the objects useful in locating the position and relative velocities of various remote vehicles in the environment of the autonomous vehicle. Such parameters can be provided to the controller 34. In operation, the transmitter 42 of the radar system 40 sends out a radio frequency (RF) reference signal 48 that is reflected back at the autonomous vehicle 10 by one or more objects 50 in the field of view of the radar system 40 as one or more reflected echo signals 52, which are received at receiver 44. The one or more echo signals 52 can be used to determine various parameters of the one or more objects 50, such as a range of the object, Doppler frequency or relative radial velocity of the object, and azimuth, etc. The sensor system 30 includes additional sensors, such as digital cameras, for identifying road features, etc.

The controller 34 builds a trajectory for the autonomous vehicle 10 based on the output of sensing system 30. The controller 34 can provide the trajectory to the actuator system 32 to control the propulsion system 22, transmission system 24, steering system 26, and/or brake system 28 in order to navigate the autonomous vehicle 10 with respect to the object 50.

The controller 34 includes a processor 36 and a computer readable storage device or storage medium 38. The computer readable storage medium includes programs or instructions 39 that, when executed by the processor 36, operate the autonomous vehicle based on sensor system outputs. The computer readable storage medium 38 may further include programs or instructions 39 that when executed by the processor 36, determines a state of object 50 in order to allow the autonomous vehicle to drive with respect the object. In particular, the processor can determine whether the object 50 is in a temporarily or permanently parked state and plan a behavior for the autonomous vehicle based on the determined state. A temporarily parked vehicle is a vehicle that is prepared to move upon a suitable signal, such as a change in a traffic light, etc.

FIG. 2A shows a plan view 200 of a first traffic scenario in which the autonomous vehicle 10 is approaching a remote vehicle 210 from behind that is non-parked or temporarily stopped. The plan view 200 shows a road having a first lane 202 or right lane and a second lane 204 or left lane. The autonomous vehicle 10 and the remote vehicle 210 are both in the first lane 202. The autonomous vehicle 10 can take a first action with respect to the remote vehicle 210 based on the remote vehicle being non-parked. As shown by planned trajectory 212, the autonomous vehicle 10 pulls up to a location 214 behind the remote vehicle 210 and stops.

FIG. 2B shows a plan view 201 of a second traffic scenario in which the autonomous vehicle 10 is approaching a remote vehicle 210 from behind that is parked or permanently stopped, such as a vehicle that has been turned off. The autonomous vehicle 10 and the remote vehicle 210 are both in the first lane 202. The autonomous vehicle 10 can take a second action with respect to the remote vehicle 210 based on the remote vehicle being parked. As shown by planned trajectory 216, the autonomous vehicle 10 changes lanes from the first lane 202 to the second lane 204 and passes the remote vehicle 210 in the second lane 204.

The autonomous vehicle 10 uses a plurality of data inputs in order to determine the state of the remote vehicle 210. For example, the autonomous vehicle 10 monitors the position and kinematics of the remote vehicle 210 at a plurality of time steps. In addition, the autonomous vehicle 10 uses perception data in order to obtain a probable state of the remote vehicle 210. For example, the autonomous vehicle 10 can monitor whether the brake light for the remote vehicle 210 is on or off. If the brake light is on, then there is a high probability that the remote vehicle 210 is non-parked. If the brake light is off, then there is a high probability that the remote vehicle 210 is parked.

Similarly, the autonomous vehicle 10 can observe a status of a traffic light and compare the status of the traffic light to a status of the remote vehicle 210. If the traffic light is green or indicates "go" and the remote vehicle 210 remains motionless, then there is a high probability that the remote vehicle is parked. The distance to the traffic light can also affect the probability calculations, since there is a delay between vehicle motion and traffic light as the distance between remote vehicle and traffic light increases. Additional cues can be taken by determining the location of various road signs, such as stops signs, parking signs, 'No Parking' signs, etc., as well as the proximity of the remote vehicle 210 to a parking meter. In addition, the type of remote vehicle can be noted. For example, a school bus might be expected to have a number of temporary stops, which should nonetheless be treated or classified as parked when it is stationary, so that the autonomous vehicle 10 does not pass illegally. Another indicator can be a thermal reading of the remote vehicle 210, whereas a 'hot' temperature reading can indicate that the remote vehicle 210 is running, while a 'cold' temperature reading can indicate that the remote vehicle 210 is parked and has been turned off. A combination of these inputs, if available, is used by the method in diagram 300 in determining the state of the remote vehicle 210.

Figure 3:
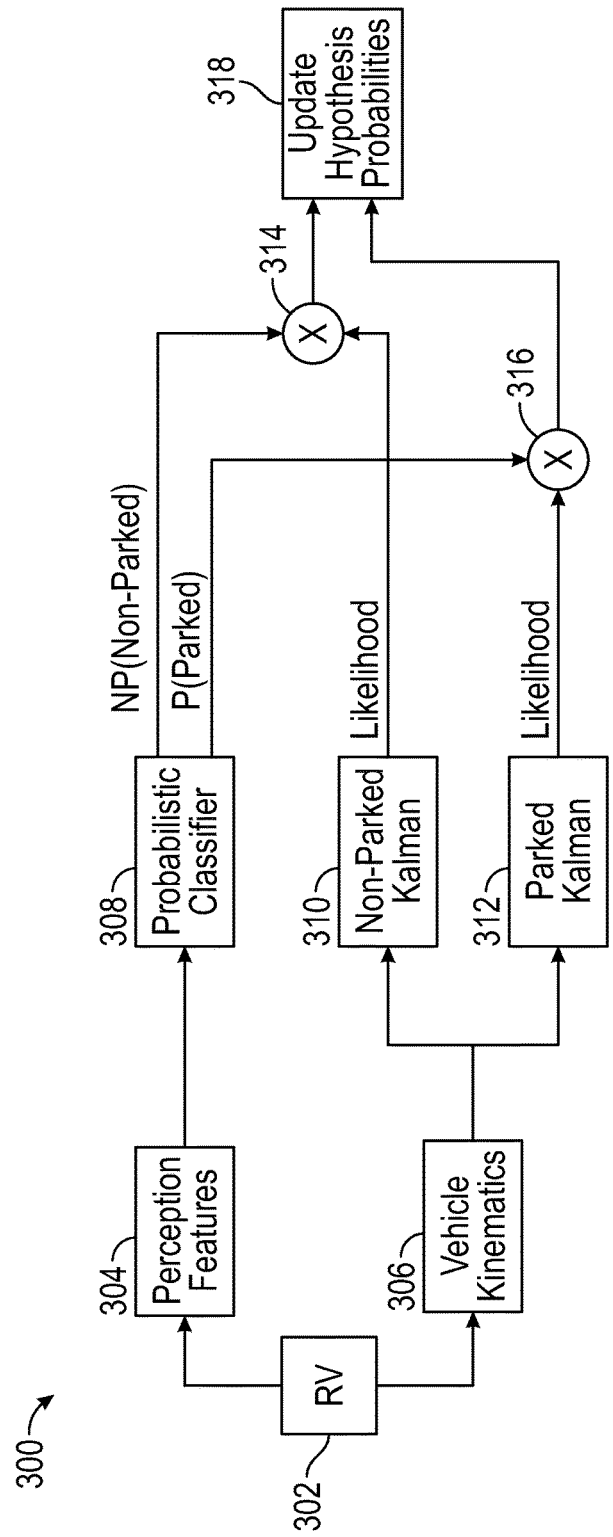
FIG. 3 shows a schematic diagram of a method for classifying a state of the remote vehicle.

FIG. 3 shows a schematic diagram 300 of a method for classifying a state of the remote vehicle 210. The classification method provides a probabilistic state of the remote vehicle by assigning a probability value to each of the possible remote vehicle states (i.e., non-parked or parked).

The method begins at box 302 where remote vehicle data is obtained at the autonomous vehicle 10. The data includes perception data 304 concerning indicators that can be obtained from the environment, and kinematic data 306, which is data regarding the motion of the remote vehicle. The perception data 304 can be, but is not limited to, the various indicators discussed herein (i.e., traffic signs, traffic lights, remote vehicle tail lights, lane markings, etc.). Kinematic data 306 can include, for example, the remote vehicle's position, velocity and acceleration. The perception data 304 is provided to a probabilistic classifier 308 which produces a probability value for the remote vehicle 210 to be in a parked state and a probability value for the remote vehicle to be in a non-parked state, based on the perception data 304. The kinematic data and perception data are obtained at a plurality of frames or time steps and provided to the processor.

The kinematic data 306 is provided to two Kalman filters to determine the likelihood of motion of the remote vehicle 210. The Kalman filters are designed depending on whether the remote vehicle 210 is in a parked state or a non-parked state. A first Kalman filter 310 (i.e., the non-parked Kalman filter) assumes an unconstrained kinematics model for non-parked vehicles, such as non-zero velocity, acceleration and turning rate. A second Kalman filter 312 (i.e., the parked Kalman filter) assumes a constrained kinematics model (e.g., zero velocity, zero acceleration and zero turning rate). The Kalman filters are updated at each time step with new data to determine the likelihood of the remote vehicle being in a selected state. The likelihood is used to update the final probability determined from the probabilistic classifier.

Referring back to FIG. 3, the probability that the remote vehicle is non-parked is multiplied by the likelihood calculation from the first Kalman filter 310 at multiplier 314. Similarly, the probability that the remote vehicle is parked is multiplied by the likelihood calculation from the second Kalman filter at multiplier 316. The results of both multiplications are used to update the hypothesis probabilities at box 318.

The likelihoods from the models are combined to update the hypothesis probabilities using the following equation:

$$P_t(H_i \mid x_{1:t}) = \frac{P_{t-1}(H_i \mid x_{1:t-1}) L_i(x_t \mid H_i)}{\sum_i P_{t-1}(H_i \mid x_{1:t-1}) L_i(x_t \mid H_i)} \quad \text{Eq. (1)}$$

where x is the track data containing track position, kinematics and perception features, $L_i(x \mid H_i)$ is the product of the classifier probability and Kalman filter likelihood for the i-th hypothesis, and $P_{t-1}(H_1 \mid x_{1:t-1})$ is the previous probability (using data up to time t−1, where t is a time step).

Figure 4:
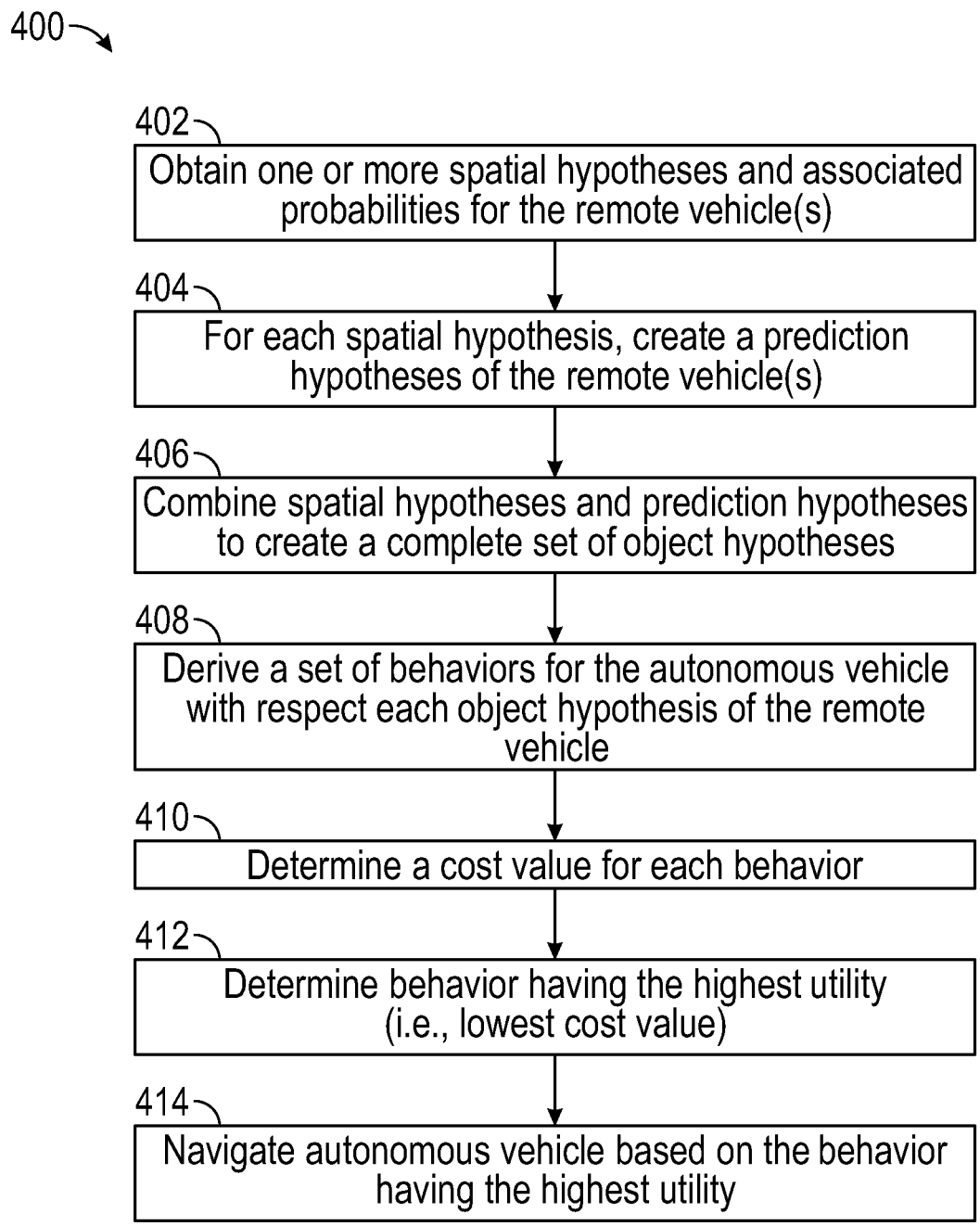
FIG. 4 shows a flowchart of a method for determining an actionable behavior at the autonomous vehicle.

FIG. 4 shows a flowchart 400 of a method for determining a cost effective or actionable behavior at the autonomous vehicle 10. In box 402, one or more spatial hypotheses are obtained for the remote vehicle(s) with their associated probabilities. The spatial hypotheses provide possible locations of the remote vehicles with associated probabilities for its state (e.g., parked or non-parked). In box 404, for each spatial hypothesis, one or more prediction hypotheses are created, with probabilities for each prediction hypothesis. The prediction hypothesis provides possible motions of the vehicle at a time in the future. A combination of spatial hypothesis and its associated prediction hypothesis forms an object hypothesis. In box 406, each of the spatial and prediction hypotheses are combined in order to create a complete set of object hypotheses. In box 408, a set of proposed behaviors are derived or assigned for the object hypothesis of the remote vehicle(s). In box 410, assuming the proposed behaviors are Von Neumann-Morgenstern (VNM) rational, a higher-order VNM rational cost value(s) for the autonomous vehicle 10 is calculated to evaluate the set of proposed behaviors. In box 412, the set of proposed behaviors with the highest utility (i.e., lowest cost value) is chosen as the optimal, most cost effective, or actionable behavior for the autonomous vehicle. In box 414, a VNM equivalent of the actionable behavior is constructed by exploring the continuous action space and the autonomous vehicle is navigated according to the VNM equivalent.

Figure 5:
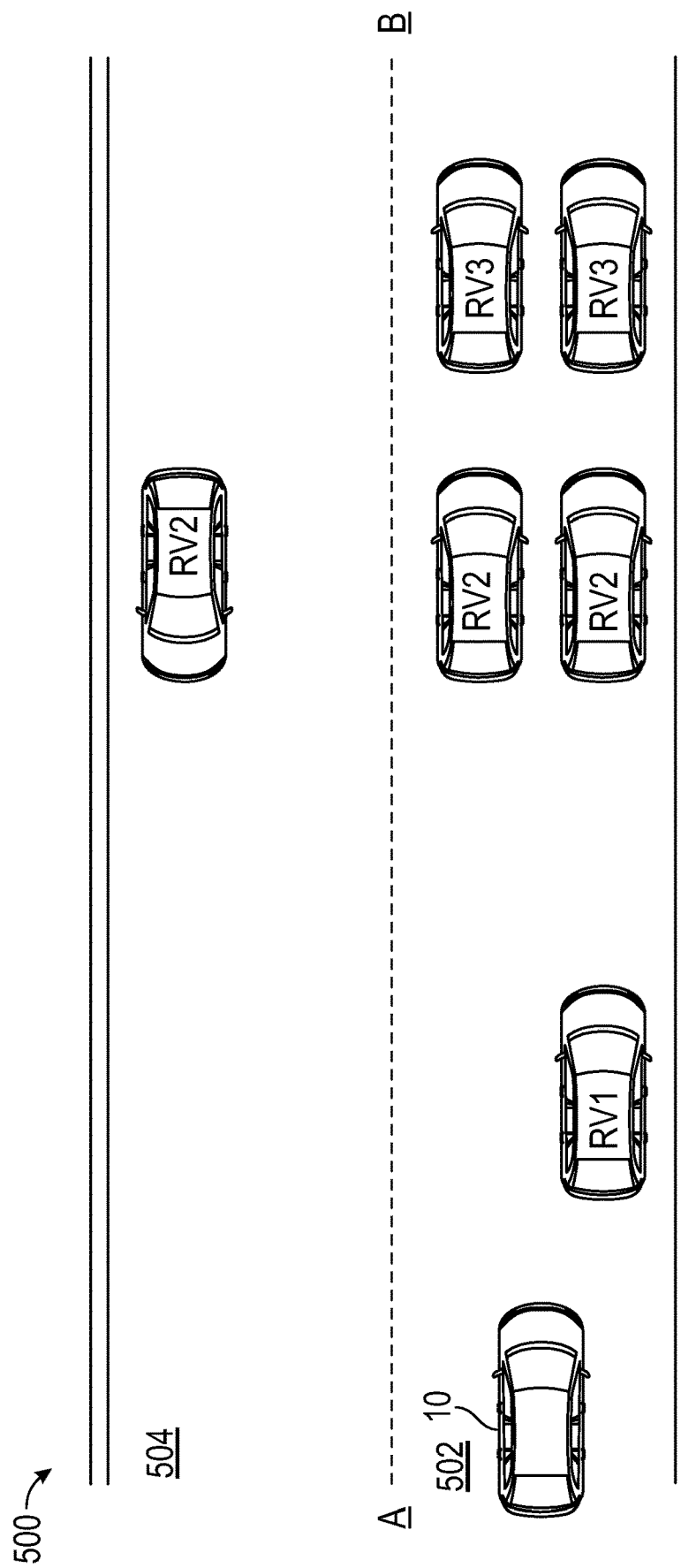
FIG. 5 shows an illustrative scenario for illustrating an operation of the method disclosed herein.

FIG. 5 shows an illustrative scenario 500 for illustrating an operation of the method disclosed herein. The scenario 500 includes the autonomous vehicle 10 and various remote vehicles RV1, RV2 and RV3. As illustrated, a roadway segment includes two lanes, with a lane 502 directed in a first direction (in the direction from A to B) and an opposing lane 504 proceeding in a second direction (in the direction from B to A) opposite the first direction. Each of lane 502 and lane 504 is assumed to be wide enough, such as two-way neighborhood streets, to allow parked vehicles on the side.

The autonomous vehicle 10 is currently residing in the lane 502 and obtains data regarding objects or remote vehicles in the roadway. In addition, the roadway includes a first remote vehicle RV1, second remote vehicle RV2 and third remote vehicle RV3. The first remote vehicle RV1 is behind the second remote vehicle RV2 which in turn is behind the third remote vehicle RV3.

Due to the uncertainty of the perception data regarding the remote vehicles RV1, RV2, RV3, each of the remote vehicles can be classified into at least one of parked and non-parked hypotheses (spatial hypotheses) for each lane direction, with each hypothesis having a probability associated with it calculated by the algorithm shown in FIG. 3. For example, the first remote vehicle RV1 is classified as being parked on the side of the lane 502 with a probability of 1.0. The second remote vehicle RV2 is classified as being parked on the side of the lane 502 with a probability of 0.4, being as non-parked in the middle of the lane 502 with a probability of 0.35 and as being parked on the side of the opposing lane 504 with a probability of 0.25. The third remote vehicle RV3 is classified as being in the middle of lane 502 with probability 0.5 and as being parked on the side of the lane 502 with probability of 0.5. Since the third remote vehicle RV3 is most distant from the autonomous vehicle, the data regarding the third remote vehicle is least reliable, leading to the parity of the probability values for the third remove vehicle.

Figure 6:
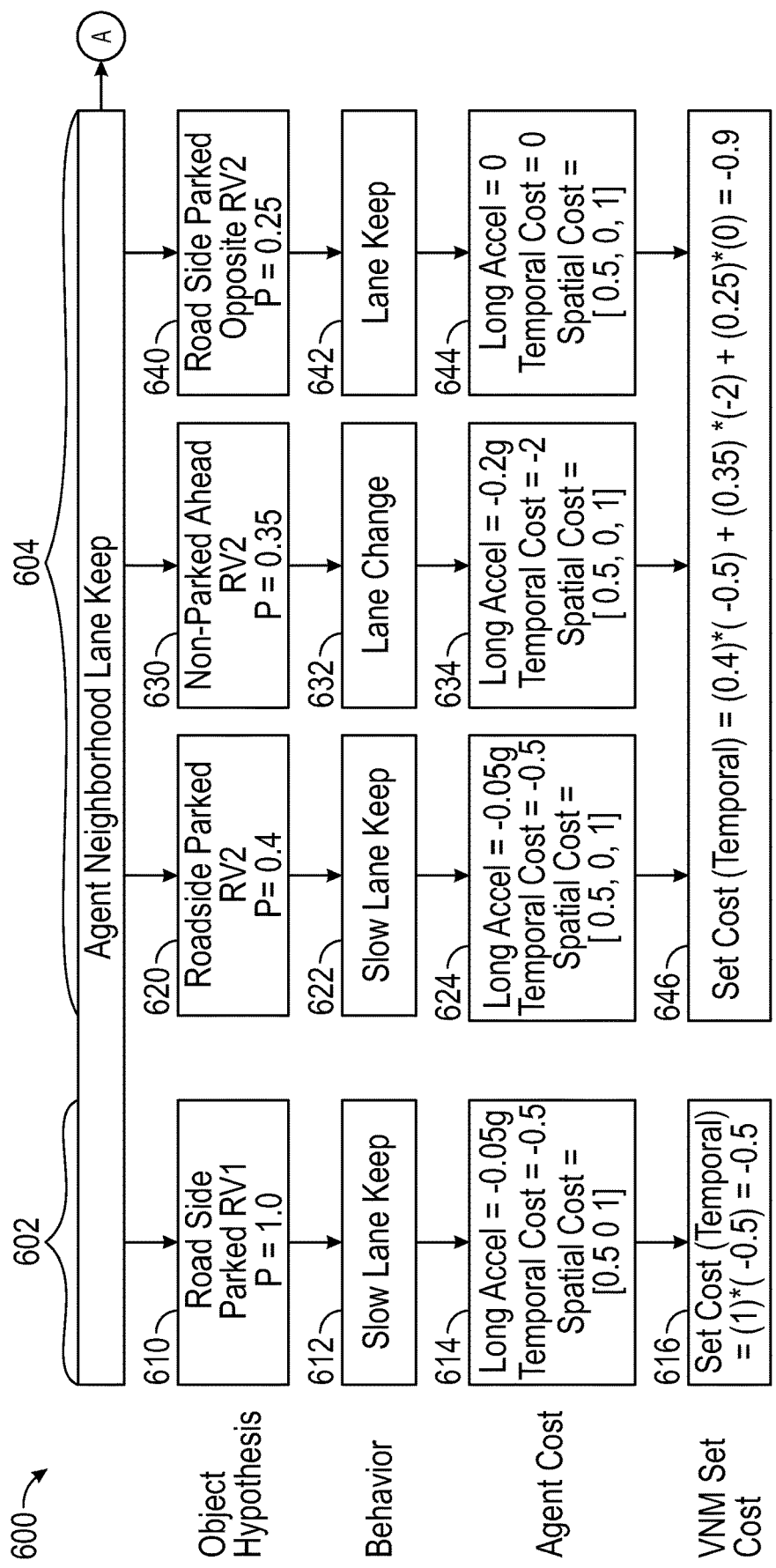
FIG. 6 shows a schematic diagram illustrating a method for selecting an actionable behavior for the autonomous vehicle based on the classification probabilities for the remote vehicles of the illustrative scenario of FIG. 5.
Figure 6:
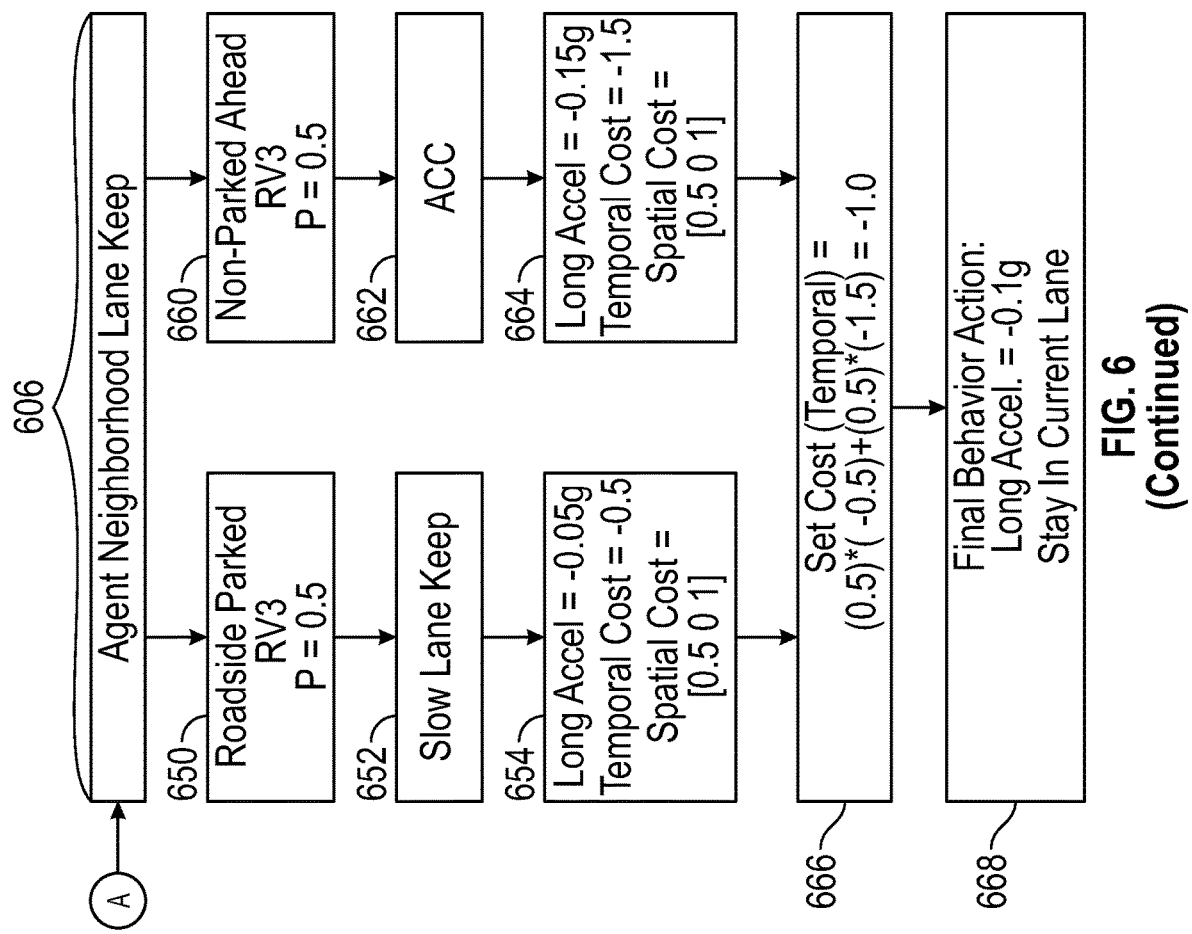

FIG. 6 shows a schematic diagram 600 illustrating a method for selecting an optimal, cost effective or actionable behavior for the autonomous vehicle 10 based on the probabilistic classifications for the remote vehicles RV1, RV2 and RV3 of FIG. 5. The schematic diagram includes a first column 602, a second column 604 and third column 606. The first column 602 shows a set of calculations regarding the first remote vehicle. The second column 604 shows a set of calculations regarding the second remote vehicle RV2, and the third column 606 shows a set of calculations regarding the third remote vehicle RV3.

For example, in the first column 602, in box 610 an object hypothesis for the first remote vehicle RV1 is shown as parked on the side with probability 1.0. In box 612 a proposed behavior is then assigned for the autonomous vehicle based on the object hypothesis (i.e., parked on the side of lane 502). In this case, the proposed behavior is to remain in the current lane and to move slowly. In box 614, spatial and temporal cost values for the autonomous vehicle 10 are then determined for the proposed behavior (from box 612). With respect to the first remote vehicle RV1, the autonomous vehicle 10 should slow down while staying in lane 502. This proposed behavior implies a negative longitudinal acceleration (e.g., −0.05 g) which translates to a temporal cost (e.g., −0.5) and a spatial cost (e.g. [0.5, 0, 1], where the first number represents a spatial cost for moving to the left, the second number represents a spatial cost for remaining along its current path and the third number represents a spatial cost for moving to the right). In box 616, a set cost is determined from the cost values and the probability of the corresponding hypothesis. The set cost is calculated as a product of the probability of the hypothesis and the cost value. For the first remote vehicle RV1, there is only one hypothesis with probability 1. Thus, total set temporal cost for the first remove vehicle RV1 is −0.5.

Turning to column 604, calculations are made for each of the possible hypotheses of the second remote vehicle RV2. In box 620, a first object hypothesis for the second remote vehicle RV2 is determined wherein the second remote vehicle RV2 is classified as parked on the side of lane 502 with probability 0.4. In box 622 a proposed behavior of moving slowly in the lane 502 is then assigned for the autonomous vehicle based on the first object hypothesis of box 620. In box 624, spatial and temporal cost values for the autonomous vehicle 10 is then determined based on the proposed behavior (from box 622). With respect to the first hypotheses for the second remote vehicle RV2, the autonomous vehicle incurs a temporal cost (e.g., −0.5), corresponding to longitudinal acceleration of −0.05 g, and a spatial cost (e.g. [0.5, 0, 1]), corresponding to staying in the current lane.

In box 630, a second object hypothesis is determined for the second remove vehicle RV2 wherein the second remote vehicle RV2 is classified as non-parked on the inside of lane 502 with probability 0.35. In box 632 a proposed behavior of changing to the left side of lane 502 is assigned for the autonomous vehicle 10 based on the second object hypothesis of box 630. In box 634, spatial and temporal cost values for the autonomous vehicle are determined based on the proposed behavior (from box 632). With respect to the second hypothesis for the second remote vehicle RV2, the autonomous vehicle 10 incurs a temporal cost −2, due to longitudinal acceleration of −0.2 g, and a spatial cost of [0.5, 0, 1].

In box 640, a third object hypothesis is determined for the second remove vehicle RV2 wherein the second remote vehicle RV2 is classified as parked in the opposing lane 504 with probability 0.25. In box 642 a proposed behavior of staying in lane 502 is assigned for the autonomous vehicle 10 based on the third object hypothesis of box 640. In box 644, spatial and temporal cost values for the autonomous vehicle are determined based on the proposed behavior (from box 642). With respect to the third hypothesis for the second remote vehicle RV2, the autonomous vehicle 10 incurs no longitudinal acceleration (e.g., longitudinal acceleration cost=0), and therefore a temporal cost of 0 and a spatial cost of [0.5, 0, 1].

In box 646, the total set cost for the second remote vehicle RV2 can be determined. The total set cost is the summation of the cost for each of the three hypotheses. The cost for each hypothesis is a product of the probability associated with the hypothesis and cost value for the hypothesis. For the illustrative hypothesis for the second remote vehicle, the set cost is calculated to be −0.9.

Similar calculations are made for the third remote vehicle RV3. Turning to column 606, calculations are made for each of the possible hypotheses of the third remote vehicle RV3. In box 650, a first object hypothesis for the third remote vehicle RV3 is determined wherein the second remote vehicle RV3 is classified as parked on the side of lane 502 with probability 0.5. In box 652, a proposed behavior of keeping slow in lane 502 is then assigned for the autonomous vehicle 10 based on the first object hypothesis of box 650. In box 654, spatial and temporal cost values for the autonomous vehicle 10 are then determined based on the proposed behavior (from box 652). With respect to the first hypothesis for the third remote vehicle RV3, the autonomous vehicle 10 incurs a longitudinal acceleration of −0.05 g (i.e., a temporal cost of −0.5 and a spatial cost [0.5, 0, 1]).

In box 660, a second object hypothesis is determined for the third remote vehicle RV3 wherein the third remote vehicle RV3 is classified as non-parked on the inside of lane 502 with probability 0.5. In box 662 a proposed behavior of following the vehicle (i.e., Adaptive Cruise Control (ACC)) is assigned for the autonomous vehicle 10 based on the second object hypothesis of box 660. In box 664, spatial and temporal cost values for the autonomous vehicle are determined based on the proposed behavior (from box 662). With respect to the second hypothesis for the third remote vehicle RV3, the autonomous vehicle 10 incurs a longitudinal acceleration of −0.15 g, which translates to a temporal cost of −1.5 and a spatial cost of [0.5, 0, 1]. In box 666, the total set cost for the third remote vehicle RV3 is determined using the methods discussed with respect to boxes 616 and 646. For the illustrative hypotheses for the third remote vehicle, the total set cost is for RV3 is calculated to be −1.

In box 668, the actionable behavior action for the scenario shown in FIG. 5 is calculated based on the minimum value of the total set costs calculated for remote vehicles. For the illustrative scenario, the actionable behavior considers the total set cost related to RV3 (minimum values of all total costs) with temporal cost of −1 and spatial cost of [0.5, 0, 1]. This implies a longitudinal acceleration of −0.1 g, with the autonomous vehicle 10 staying in the current lane (lane 502).

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A computer-implemented method of navigating an autonomous vehicle, comprising:
classifying, at a processor, each of a plurality of remote stationary vehicles into an object hypothesis, each object hypothesis including a possible location for an associated remote stationary vehicle and a probability associated with the possible location that the associated remote stationary vehicle is in a parked state;
determining, at the processor, a proposed behavior for the autonomous vehicle for each object hypothesis, each proposed behavior based on the possible location for the associated remote stationary vehicle and the probability associated with the possible location;
determining a temporal cost for each proposed behavior based on a longitudinal acceleration of the proposed behavior;
calculating a set cost for each object hypothesis based on a product of the probability associated with the object hypothesis and the temporal cost associated with the object hypothesis;
selecting an actionable behavior for the autonomous vehicle from the proposed behavior for which the set cost is a least value; and
controlling the autonomous vehicle, at the processor, to perform the actionable behavior.

2. The method of claim 1, further comprising:
calculating a Von Neumann—Morgenstern (VNM) cost value for the autonomous vehicle for the proposed behavior;
determining the set cost to the autonomous vehicle for the proposed behavior based on the VNM cost value and the probability of the object hypothesis.

3. The method of claim 1, further comprising determining a plurality of object hypotheses for a remote stationary vehicle and calculating the set cost for each object hypothesis.

4. The method of claim 1, wherein classifying the associated remote stationary vehicle further comprises using kinematic data and perception data related to the associated remote stationary vehicle.

5. The method of claim 4, further comprising applying a first Kalman filter to the kinematic data for determining a likelihood of the associated remote stationary vehicle being a temporarily parked vehicle and a second Kalman filter to the kinematic data for determining a likelihood of the associated remote stationary vehicle being a permanently parked vehicle, wherein the first Kalman filter includes an unconstrained kinematic model and the second Kalman filter includes a constrained kinematic model.

6. The method of claim 1, wherein the object hypothesis includes a spatial hypothesis based on a current state of the associated remote stationary vehicle and a predicted hypothesis based on a predicted future motion for the associated remote stationary vehicle.

7. A system for navigating an autonomous vehicle, comprising:
one or more sensors for obtaining data with respect to a plurality of remote stationary vehicle; and
a processor configured to:
classify each of the plurality of remote stationary vehicles into an object hypothesis based on the data, each object hypothesis including a possible location for an associated remote stationary vehicle and a probability associated with the possible location that the remote stationary vehicle is in a parked state;
determine a proposed behavior for the autonomous vehicle for each object hypothesis, each proposed behavior based on a possible location for the remote stationary vehicle and the probability associated with the possible location;
determine a temporal cost for each proposed behavior based on a longitudinal acceleration of the proposed behavior;
calculate a set cost for each object hypothesis based on a product of the probability associated with the object hypothesis and the temporal cost associated with the object hypothesis;
select an actionable behavior for the autonomous vehicle from the proposed behavior for which the set cost is a least value; and
control the autonomous vehicle to perform the actionable behavior.

8. The system of claim 7, wherein the processor is further configured to:
calculate a Von Neumann—Morgenstern (VNM) cost value for the autonomous vehicle for the proposed behavior;
determine the set cost for the autonomous vehicle for the proposed behavior based on the VNM cost value and the probability for the object hypothesis.

9. The system of claim 7, wherein the processor is further configured to determine a plurality of object hypotheses for a remote stationary vehicle and calculate the set cost for each object hypothesis.

10. The system of claim 7, wherein the processor is further configured to classify the associated remote stationary vehicle using kinematic data and perception data related to the associated remote stationary vehicle.

11. The system of claim 10, wherein the processor is further configured to apply a first Kalman filter to the kinematic data for determining a likelihood of the associated remote stationary vehicle being a temporarily parked vehicle and a second Kalman filter to the kinematic data for determining a likelihood of the associated remote stationary vehicle being a permanent parked vehicle, wherein the first Kalman filter includes an unconstrained kinematic model and the second Kalman filter includes a constrained kinematic model.

12. The system of claim 7, wherein the processor is further configured to form the object hypothesis from at least one spatial hypothesis based on a current state of the associated remote stationary vehicle and a predicted hypothesis based on a predicted future motion for the associated remote stationary vehicle.

13. An autonomous vehicle, comprising:
one or more sensors for obtaining data with respect to a plurality of remote stationary vehicles; and
a processor configured to:
classify each of the plurality of remote stationary vehicles into an object hypothesis based on the data, each object hypothesis including a possible location for an associated remote stationary vehicle and a probability associated with the possible location that the remote stationary vehicle is in a parked state;
determine a proposed behavior for the autonomous vehicle for each object hypothesis, each proposed behavior based on the possible location for the remote stationary vehicle and the probability associated with the possible location;
determine a temporal cost for each proposed behavior based on a longitudinal acceleration of the proposed behavior;
calculate a set cost for each object hypothesis based on a product of the probability associated with the object hypothesis and the temporal cost associated with the object hypothesis;
select an actionable behavior for the autonomous vehicle, from the proposed behavior for which the set cost is a least value; and
control the autonomous vehicle to perform the actionable behavior.

14. The autonomous vehicle of claim 13, wherein the processor is further configured to:
calculate a Von Neumann—Morgenstern (VNM) cost value for the autonomous vehicle for the proposed behavior;
determine the set cost to the autonomous vehicle for the proposed behavior based on the VNM cost value and the probability of the object hypothesis.

15. The autonomous vehicle of claim 13, wherein the processor is further configured to determine a plurality of object hypotheses for a remote stationary vehicle and calculate the set cost for each object hypothesis.

16. The autonomous vehicle of claim 13, wherein the processor is further configured to classify the associated remote stationary vehicle using kinematic data and perception data related to the associated remote stationary vehicle.

17. The autonomous vehicle of claim 16, wherein the processor is further configured to apply a first Kalman filter to the kinematic data for determining a likelihood of the associated remote stationary vehicle being a temporarily parked vehicle and a second Kalman filter to the kinematic data for determining a likelihood of the associated remote stationary vehicle being a permanently parked vehicle, wherein the first Kalman filter includes an unconstrained kinematic model and the second Kalman filter includes a constrained kinematic model.

* * * * *